United States Patent [19]

Kashio

[11] 3,859,514

[45] Jan. 7, 1975

[54] ARITHMETIC OPERATION AND TRAILING ZERO SUPPRESSION DISPLAY UNIT

[75] Inventor: Toshio Kashio, Tokyo, Japan

[73] Assignee: Casio Computer Co., Ltd., Tokyo, Japan

[22] Filed: May 31, 1973

[21] Appl. No.: 365,620

[30] Foreign Application Priority Data

May 31, 1972 Japan .............................. 47-53943

[52] U.S. Cl. ........... 235/156, 340/172.5, 340/324 R

[51] Int. Cl. .............................................. G06f 3/14

[58] Field of Search ........... 235/156, 159, 160, 164, 235/168; 340/172.5, 324 R

[56] References Cited

UNITED STATES PATENTS

| | | | |
|---|---|---|---|
| 3,375,498 | 3/1968 | Scuitto et al. | 340/172.5 |
| 3,492,656 | 1/1970 | Hildebrandt | 340/172.5 |
| 3,760,171 | 9/1923 | An Wang et al. | 235/156 |

*Primary Examiner*—Malcolm A. Morrison
*Assistant Examiner*—David H. Malzahn
*Attorney, Agent, or Firm*—Flynn & Frishauf

[57] ABSTRACT

An arithmetic operation and indication apparatus of the double length system which comprises a Y register for storing operators and an X register including a first and a second half memory section each provided with the same number of digit positions as those of the Y register and having the first half memory section stored with operands, wherein the so-called underflow system is adopted to indicate the result of arithmetic operation and suppress the insignificant digits which might otherwise appear in the blank digit positions following the lowest order digit of a significant number finally obtained by said operation, starting with the insignificant digit of lowest order included in the second half memory section.

2 Claims, 9 Drawing Figures

ARITHMETIC OPERATION AND TRAILING ZERO SUPPRESSION DISPLAY UNIT

BACKGROUND OF THE INVENTION

This invention relates to an arithmetic operation and indication apparatus of the double length system and more particularly to an arithmetic operation and indication apparatus which is capable of indicating a significant number obtained by arithmetic operation by suppressing the insignificant digits which might otherwise appear in the blank digit positions following the lowest digit of a significant number finally obtained by said operation.

A calculator widely accepted to date is so designed that where there are supplied signals representing operators and operands for arithmetic operation and signals instructing arithmetic operation, then the result of said operation is completely indicated on the indication device of the calculator. Namely, the indication device is so designed as to have a sufficient number of digit positions to indicate an answer arrived at by arithmetic operation, even though a number being indicated may consist of many digits. For example, multiplication by a large number can be well effected within a range generally required, with all the digits included in a product fully indicated.

However, such conventional calculator must have the indication device considerably enlarged to provide a large number of digit positions, failing to be rendered compact. On the other hand, a midget calculator sometimes can not fully indicate the result of an arithmetic operation, for example, multiplication. A very small calculator whose indication device can only indicate a number of four digits makes impossible such multiplication as would arrive at a product consisting of more than four digits, attaining an extremely low calculating capacity.

To eliminate the above-mentioned drawback, the so-called double-length system has been adopted. According to this system, arithmetic operation is carried out by an operational register capable of storing twice as many digits as those which are indicated in the indication device. Namely, halves of the result of arithmetic operation are indicated in turn by means of a changeover switch.

This double length system indeed has the advantage of indicating many digits. Generally, however, the system first indicates the latter half of the result of arithmetic operation and then the former half thereof, sometimes giving rise to the danger of an indicated answer being incorrectly read.

To eliminate the above shortcoming, therefore, the so-called underflow system has cone to be used which is so designed as to first indicate the former half of an answer and, only where the answer consists of more digits than those included in the former half, thereafter indicate the digits of the latter half. Still, some defects have been pointed out in this underflow type double length system. For example, where two half groups of digits constituting a significant number containing decimal places are indicated in turn, the user finds difficulties in unfailingly confirming the highest order of said number, Further, if, in such type of calculator as is incapable of carrying out arithmetic operation including decimal places, a plurality of zeros follow a group of indicated digits the last of which is constituted by any other digit than zero, then the user can hardly judge whether said plural zeros represent in whole or in part a significant or insignificant fraction of an effective number actually obtained by an arithmetic operation and similarly finds it difficult accurately to ascertain the highest order of the effective number.

SUMMARY OF THE INVENTION

It is accordingly the object of this invention to provide an arithmetic operation and indication apparatus which is free from the aforesaid drawbacks accompanying the prior underflow type double length system and can indicate a significant number starting with the digit of the highest order by suppressing as many insignificant digits as the number of times shifting is made in the register, beginning with the insignificant digit of the lowest order.

To attain this object, the arithmetic operation and indication apparatus of this invention comprises a first register for storing either an operator or an operand and a second register capable of storing twice as many digits as those stored in the first register, with the preceding half memory section of said second register stored with either an operand or an operator. Namely, the present apparatus adopts the aforesaid underflow type double length system wherein digits representing the result of arithmetic operation which are stored in the succeeding half memory section of the second register are successively shifted to be indicated starting with the digit of the highest order; the number of these shifts is counted; and as many insignificant digits as the shifting times are suppressed, starting with the lowest order insignificant digit, thereby enabling the user accurately to confirm the highest order of a significant number obtained by arithmetic operation. Therefore, the apparatus of this invention is not only obviously effective to indicate the result of arithmetic operation containing decimal places, but also prominently assists the user in correctly ascertaining the highest order of a significant number obtained by arithmetic operation.

DETAILED DESCRIPTION OF PREFERRED EMBODIMENTS OF THE INVENTION

Figure 1:
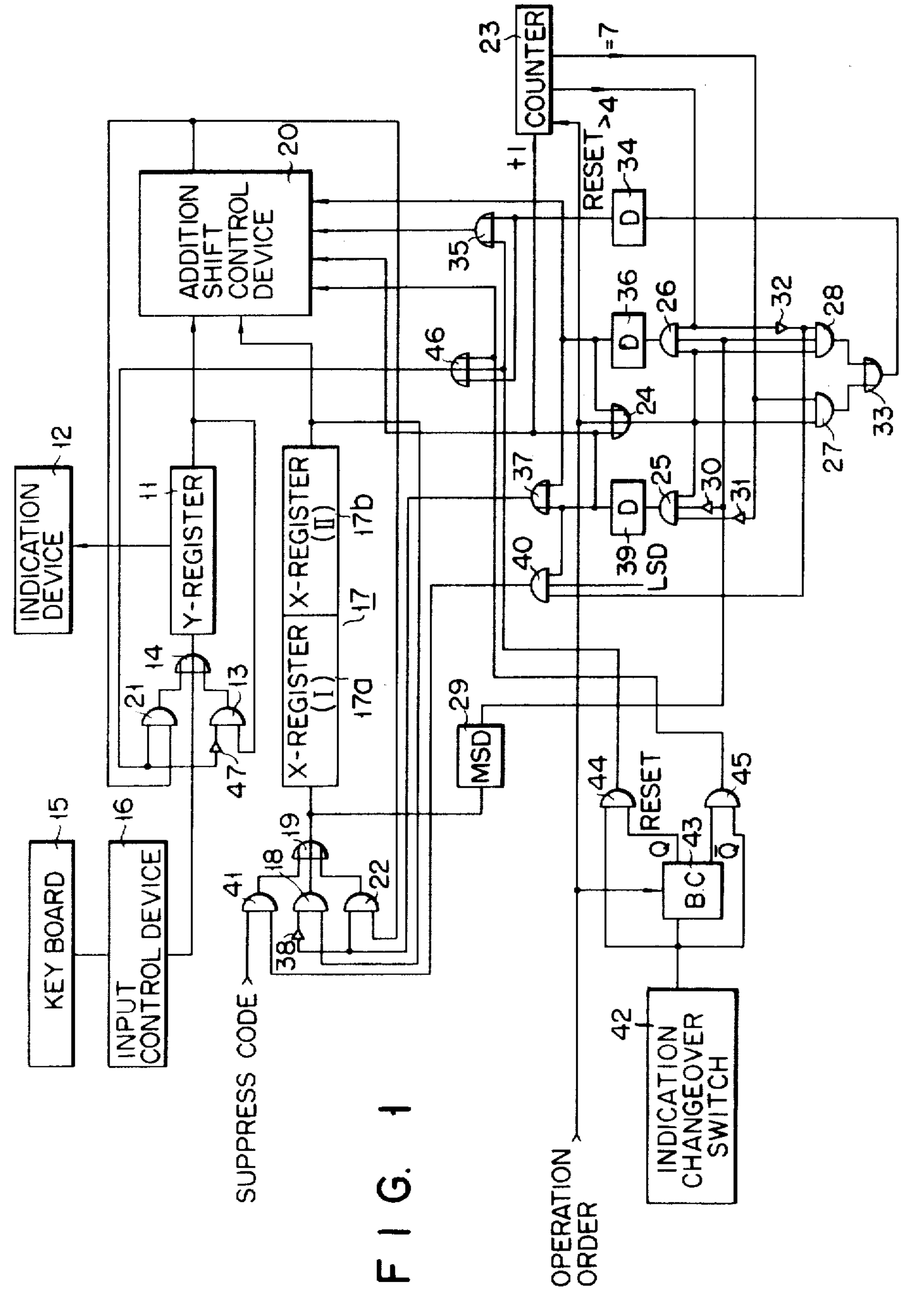
FIG. 1 is a circuit arrangement of the arithmetic operation and indication apparatus of this invention.

There will now be described this invention by reference to the accompanying drawings. For illustration, reference is made to multiplication. Referring to FIG. 1, a Y register 11 is rpovided with an indication device 12 for indicating the digits stored therein. Arrangement is made for said digits to be shifted through an AND circuit 13 and OR circuit 14. Digits specified by operation of a keyboard 15 are conducted to the OR circuit 14 through an input control circuit 16 to be stored in the Y register 11. X register 17 disposed to match the Y register consists of first and second half memory sections 17a and 17b arranged in series, each of which has the capacity of storing the same number of digits as the Y register 11. Namely, the X register 17 has twice as many digit positions as those of the Y register 11. The shifting of digits stored in the X register 17 is carried out through an AND circuit 18 and OR circuit 19. The output terminals of the Y and X registers 11 and 17 are connected to an addition shift control circuit 20, the output terminal of which in turn is connected to the OR circuits 14 and 19 respectively constituting the input circuits of the Y and X registers 11 and 17.

The operation control group of the subject apparatus provided to match the above-mentioned digit memory group includes a counter 23, which generates a signal when it makes 4 or less counts and 7 counts, and is reset upon receipt of an operation instructing signal. This operation instructing signal is conducted to an OR circuit 24, an output signal from which in turn is supplied to AND circuits 25, 26, 27 and 28. The AND circuit 25 is supplied through inverters 30 and 31 with an output signal from an MSD (Most Significant Digit) detection circuit 29 connected to the input terminal of the X register 17 and designed to produce a detection signal when a digit other than zero is shifted to the digit position of the highest order, as well as with an output signal from the counter 23 when it makes 7 counts. The AND circuit 26 is supplied with a detection signal from the MSD detection circuit 29 and a gate signal consisting of an output signal from the counter 23 when it makes 4 or less counts. The AND circuit 27 is supplied with a gate signal consisting of an output from the counter 23 when it makes 7 counts. The AND circuit 28 is supplied through an inverter 32 with a detection signal from the MSD detection circuit and an output signal from the counter 23 when it makes 4 or less counts.

Output signals from the AND circuits 27 and 28 are conducted through an OR circuit 33 to a delay circuit 34 consisting of delayed flip-flop means. An output signal from the delay circuit 34 is supplied through an OR circuit 35 to the addition shift control circuit 20 so as to instruct the shifting of data stored in the second half memory section 17*b* of the X register 17 to the Y register 11 through the addition shift control circuit 20. An output signal from the AND circuit 26 is conducted to the addition shift control circuit 20 through a delay circuit 36 consisting of delayed flip-flop means so as to instruct operation. Said output signal is further supplied to the OR circuit 24, to the AND circuit 22 as a gate signal through an OR circuit 37 and to the AND circuit 18 also as a gate signal through an inverter 38. An output signal delivered from the AND circuit 25 through the OR circuit 24 upon receipt of an operation instructing signal is further supplied to a delay circuit 39 consisting of delayed flip-flop means. An output signal from the delay circuit 39 is transmitted to the OR circuits 24 and 37, as well as to the counter 23 as a signal representing +1. The output signal from the delay circuit 39 is also supplied to the addition shift control circuit 20 to instruct the commencement of shifting in the X register 17. The output signal from the delay circuit 39 is conducted to an AND circuit 40, an output signal from which is supplied as a gate signal to an AND circuit 41 supplied with a suppress code signal. The suppress code signal from the AND circuit 41 is transmitted to the OR circuit 19. The AND circuit 40 is supplied with an output signal from the inverter 32 and an LSD (Least Significant Digit) signal denoting the digit of lowest order.

The arithmetic operation and indication apparatus of this invention arranged as described above further includes an indication changeover switch 42 which actuates a binary counter 43. A first and a second output signal from the binary counter 43 whose polarities are inverted each time are suppplied to the gate terminals of AND circuits 44 and 45 respectively, the output signals from which are conducted to an OR circuit 46. This OR circuit 46 is supplied with an output signal from the delay circuit 34. An output signal from said OR circuit 46 is transmitted to the AND circuit 21 as a gate signal and also to the AND circuit 13 through an inverter 47 similarly as a gate signal. An output signal from the AND gate 45 is sent to the addition shift control circuit 20 so as to effect the changeover of indication. An output signal from the AND gate 44 is carried to the OR circuit 35.

Figure 2:
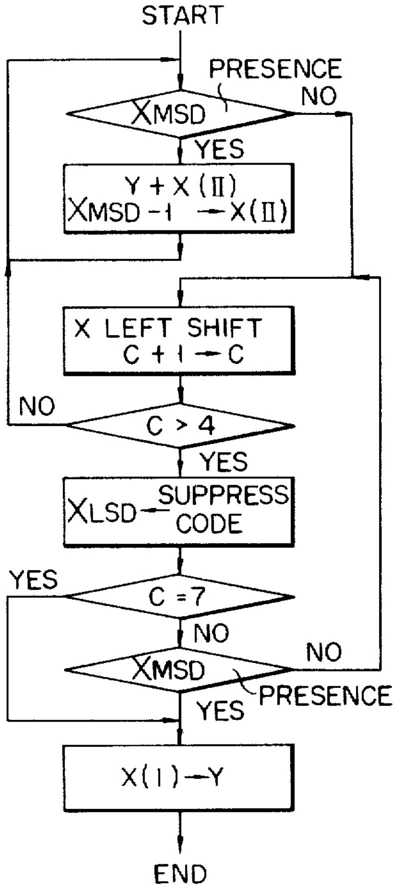
FIG. 2 is a flow chart illustrating the operation of said apparatus.
Figure 3A:
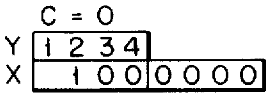
FIGS. 3A to 3G schematically show the manner in which digits are stored in the registers used in the apparatus of FIG. 1.
Figure 3B:
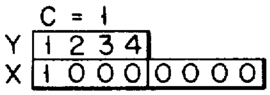
Figure 3C:
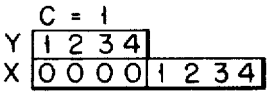

There will now be described the case where the apparatus of this invention having the above-mentioned arrangement carries out an arithmetic operation, for example 1,234 × 100, by reference to the flow chart of FIG. 2 and the conditions of the Y and X registers 11 and 17 of FIG. 3 in which digital data are stored. To begin with, a first number 1234 used as a multiplicand and a second number 100 used as a multiplier are stored through the input control circuit 16 in the Y register and the first half memory section 17*a* of the X register respectively by operation of the keyboard 15 as in the ordinary calculator. In this case, instruction of multiplication is given while the multiplier and multiplicand are specified by operation of the keyboard 15. Accordingly, the Y and X registers 11 and 17 present such stored conditions as illustrated in FIG. 3A. Under this condition, an operation instructing signal is given, for example, by working an "equal" button on the keyboard 15. This operation instruction resets the counter 23, causing it to make a zero count. The operation instructing signal is supplied to the OR circuit 24. Since, at this time, the X register 17 is not stored with any digit occupying the foremost digit position, the MSD detection circuit 29 gives forth no output signal, an output signal from the inverter 30 bears a state of 1, the counter 23 makes 0 count, and an output signal from the inverter 31 presents a state of 1. Under such initial condition, an output signal from the AND circuit 25 is supplied to the delay circuit 39. The delay circuit 39, as well as the other delay circuits 34 and 36, is delayed by a unit period of shifting occurring in the X register 17. When a digit occupying the foremost digit position of the X register 17 is shifted to the input terminal thereof, the delay circuit 39 produces an output signal to open the gate of the AND circuit 22 and close the gate of the AND circuit 18. At this time, the addition shift control circuit 20 receives a signal instructing the commencement of leftward shifting in the X register 17, causing the data stored therein to be shifted leftward by one digit position. As the result, the counter 23 makes a count of +1, presenting a state of C=1 illustrated in FIG. 3B.

Figure 3D:
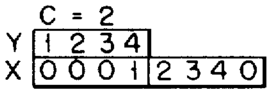
Figure 3E:
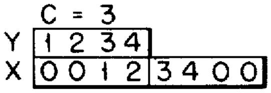
Figure 3F:
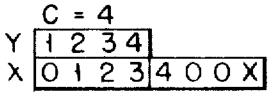

An output from the delay circuit 39 is also shifted to the OR circuit 24. Since, at this time, the X register 17 is in the condition of FIG. 3B, the MSD detection circuit 29 generates an output signal, and the counter 23 makes a count of 4 or less counts, causing the AND circuit 26 to deliver a signal to the delay circuit 36. An output signal from the delay circuit 36 opens the AND circuit 22 through the OR circuit 37, closes the AND circuit 18, and stops shifting in the X register. At this time, the addition shift control circuit 20 is supplied with an operation shift instructing signal which causes the data stored in the Y register 11 to be shifted to the second half memory section 17*b* of the X register 17 and the digit 1 taking the foremost digit position of the X register 17 to be eliminated, thus resulting in the condition of FIG. 3C. The counter 23 receives no instruction and maintains a state of C=1.

Where the digit 2, for example, occupies the foremost digit position of the X register 17 and the above-mentioned operation is made, then the second half memory section 17*b* of the X register 17 is stored with a number 1234, and the foremost digit position of the X register 17 presents a state of 2−1=1. When the above-mentioned operation is repeated, a result arrived at by multiplying digits successively occupying the foremost digit position of the X register 17 each time of shifting by the multiplier of the Y register 11 is stored in the second half memory section of the X register 17, resulting in the condition of FIG. 3B. Under this condition, zero takes the foremost digit position of the X register 17, the AND circuit 25 generates an output signal as in FIG. 3A. While leftward shifting is made in the X register 17 as illustrated in FIGS. 3D and 3E, the counter 23 makes increasing counts.

Figure 3G:
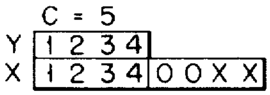

When the counter 23 makes 4 counts, namely, when all the digits constituting the multiplicand initially stored in the first half memory section 17*a* of the X register 17 are removed from said section 17*a*, then the inverter 32 produces an output signal bearing a state of 1. Accordingly, the AND circuits 25 and 40 simultaneously produce output signals in synchronization with the generation of a signal representing the LSD taking the rearmost digit position of the *X* register 17. Therefore, when the LSD is shifted, the gate of the AND circuit 41 is opened to cause a suppress code *x* to be stored in the rearmost digit position, presenting the condition of FIG. 3F. Where leftward shifting is repeated in the *X* register to store another suppress code *x* and a digit other than zero appears at the foremost digit position of the *X* register 17 as shown in FIG. 3G, then the MSD detection circuit 29 generates an output signal. At this time, the counter makes 5 counts and the inverter 32 gives forth an output signal bearing a state of 1 to actuate the AND circuit 28, so that the OR circuit 33 generates a signal denoting the completion of arithmetic operation. This signal showing the completion of arithmetic operation passes through the delay circuit 34 to control the AND circuits 13 and 21 disposed on the input side of the Y register 11 and also causes the addition shift control circuit 20 to give a signal instructing the data stored in the first half memory section 17*a* of the X register 17 to be shifted to the Y register 11, thereby presenting the number 1234 initially stored in the first half memory section 17*a* of the X register 17 in the indication device 12. Where, under this condition, the indication changeover switch is actuated, then the AND circuit 45 is operated which is connected to the output terminal Q of the binary counter 43 when it is reset by the initial operation instructing signal. An output signal from the AND circuit 45 causes the addition shift control circuit 20 to produce a signal instructing the data stored in the second half memory section 17*b* of the X register 17 to be shifted to the Y register 11, thereby indicating the remaining digits 00 of a product of multiplication. The above-mentioned operational process consists in causing the data stored in the first and second half memory sections 17*a* and 17*b* of the X register 17 to be shifted to the Y register 11 by turns, namely, to indicate a product of multiplication in two divisions. In this case, two blank digit positions following the final product 1234 are indicated by a suppress code *x*, instead of 0, attaining the accurate indication of a true answer.

The foregoing embodiment refers to the case where there was obtained an answer consisting of more digits than the memory capacity (4 digits) of the first half memory section 17*a* of the X register 17. Accordingly, a signal instructing the completion of arithmetic operation was given upon receipt of a detection signal from the MSD detection circuit 29. Where, however, an answer consists of two digits, the counter 23 is caused to make 7 counts arrived at by deducting one digit position from all the eight digit positions of the X register 17. When the counter 23 makes 7 counts the AND circuit 27 generates a signal denoting the completion of arithmetic operation.

In the above-mentioned embodiment, a multiplier was stored in the Y register and a multiplicand in the first memory section of the X register. However, it is possible conversely to store a multiplicand in the Y register and a multiplier in the X register.

The foregoing description refers to the case where multiplication was carried out by the arithmetic operation apparatus of this invention. Obviously, the invention is also applicable to any other type of arithmetic operation, provided the insignificant digits which might otherwise appear in the blank digit positions following the lowest order digit of a significant number obtained by arithmetic operation are indicated by a suppress notation other than 0, starting with the insignificant digit of lowest order.

What is claimed is:

1. An electrically actuated indication apparatus for storing and displaying numerical data, said numerical data including a head portion of data and a tail portion of data, comprising:

indicator means including a plurality of digit indicators for displaying numerical data;

memory means coupled to said indicator means and having a greater number of digits of storage capacity than the number of digit indicators of said indicator means, said memory means being adapted to store said numerical data;

means for shifting said numerical data in said memory means such that the most significant digit of said numerical data coincides with the most significant one of the digits of said memory means;

means for ordering said indicator means to indicate the digits in the head portion of said numerical data shifted in said memory means by said shifting means, said digits in said head portion of data being identical in number with the number of digits of said indicator means for displaying said numerical data;

means for generating an order signal which orders said indicator means to display the numerical data in the tail portion of said shifted numerical data instead of the head portion;

means responsive to said order signal for ordering said indicator means to display the digits in the tail portion of data successively first at the most significant digit position and at the succeeding ones so that the most significant one of the digits in the tail portion of data may be indicated following the least significant one of the digits in the head portion of data, the display of which was switched off by said order signal;

discriminating means for distinguishing the least significant one of the digits in the tail portion of said numerical data from the digits following said least significant digit; and suppressing means controlled by said discriminating means and adapted to suppress those digit positions of said indicator means which correspond to the digits following said least significant digit of the tail portion of data.

2. An electrically actuated arithmetic operation and indication apparatus for storing and displaying numerical data, comprising:

an arithmetic operation means;

a first register for storing first numerical data necessary for an arithmetic operation;

a second register coupled with said arithmetic operation means and having twice as many digits of storage as said first register, said second register being adapted to store second numerical data necessary for an arithmetic operation;

means for effecting the shifting of data in said second register to bring first the most significant digit of said second numerical data and successively the remaining digits into arithmetic operation with the digits of said first numerical data in said arithmetic operation means, and thereby storing the results of the arithmetic operation first in the least significant digit position of said second register and successively in the digit positions preceding said least significant one;

means for detecting the completion of the arithmetic operation and for shifting the results of the operation up to the most significant digit position of said second register;

indicator means coupled to said second register and including a plurality of digit indicators and means for displaying the results of the arithmetic operation on said plurality of digit indicators;

means for ordering said indicator means to indicate the results of the arithmetic operation such that the most significant digit of said results of said arithmetic operation coincides with the most significant digit of said indicator means; and suppressing means for suppressing the digits of said indicator means which correspond to those digits of said results of said arithmetic operation which follow the least significant digit.

* * * * *